United States Patent [19]

Narhi et al.

[11] Patent Number: 5,157,677
[45] Date of Patent: Oct. 20, 1992

[54] SINGLE FREQUENCY, LONG TAIL SOLID STATE LASER INTERFEROMETER SYSTEM

[75] Inventors: Donald E. Narhi, Moorpark; Farzin Amzajerdian, Thousand Oaks, both of Calif.

[73] Assignee: Litton Systems, Inc., Beverly Hills, Calif.

[21] Appl. No.: 700,377

[22] Filed: May 13, 1991

[51] Int. Cl.[5] .............................. H01S 3/13
[52] U.S. Cl. ...................... 372/32; 372/13; 372/20; 372/29
[58] Field of Search ............... 372/13, 32, 10, 20, 372/29

[56] References Cited

U.S. PATENT DOCUMENTS

| | | | |
|---|---|---|---|
| 3,856,402 | 12/1974 | Low et al. | 356/5 |
| 4,298,280 | 11/1981 | Harney et al. | 356/5 |
| 4,329,664 | 5/1982 | Javan | 372/32 |
| 4,447,149 | 5/1984 | Marcus et al. | 356/28.5 |
| 4,690,551 | 9/1987 | Edwards et al. | 356/5 |
| 4,928,284 | 5/1990 | Burns | 372/13 |
| 4,995,720 | 2/1991 | Amzajerdian | 356/5 |
| 5,022,033 | 6/1991 | Hackell | 372/13 |

OTHER PUBLICATIONS

Goldstein, et al., "Characteristics of a Traveling-Wave Ruby Single-Mode Laser Transmitter", (Sep. 1968), Journal of Quantum Electronics, vol. QE-2, pp. 519–523.

Menzies, et al., "Atmospheric Aerosol Backscatter Measurements Using a Tunable Coherent $CO_2$ Lidar", Applied Optics Article, Aug. 1, 1984, vol. 23, No. 15, pp. 2510–2517.

Post, et al., "Optimizing a Pulsed Doppler Lidar", Applied Optics Article, Oct. 1, 1990, vol. 29, No. 28, pp. 4145–4158.

Bilbro et al., "Airborne Doppler Lidar Measurements", Applied Optics Article, Nov. 1, 1986, vol. 25, No. 21, pp. 3952–3957.

Primary Examiner—Léon Scott, Jr.
Attorney, Agent, or Firm—Edmund W. Rusche

[57] ABSTRACT

A single frequency solid state laser has been designed for generation of a high power Q-switch pulse followed by a quasi-CW low power tail by properly controlling the laser resonator transmission via an intracavity Q-switch. The generation of a stable single frequency pulse is accomplished by a primary feedback control system containing a central timing and prelase control unit. Generation and smoothing control of a quasi-CW pulse tail is accomplished through a secondary feedback control system.

27 Claims, 5 Drawing Sheets

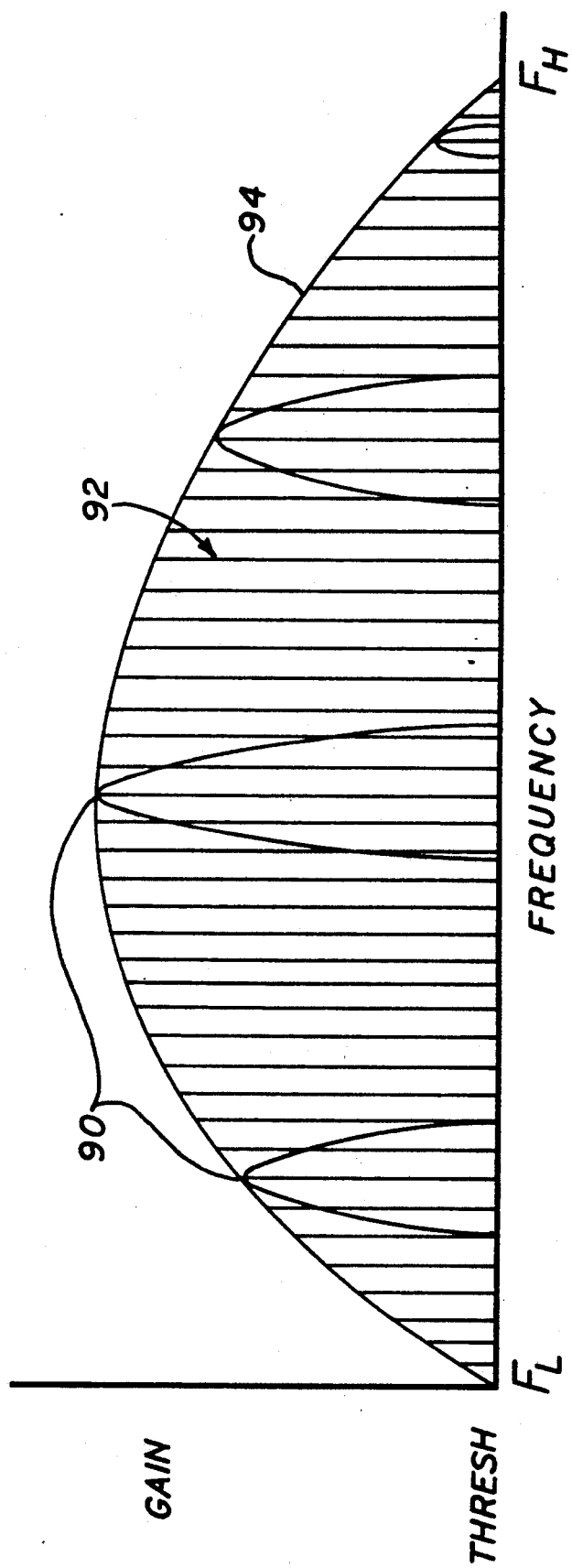

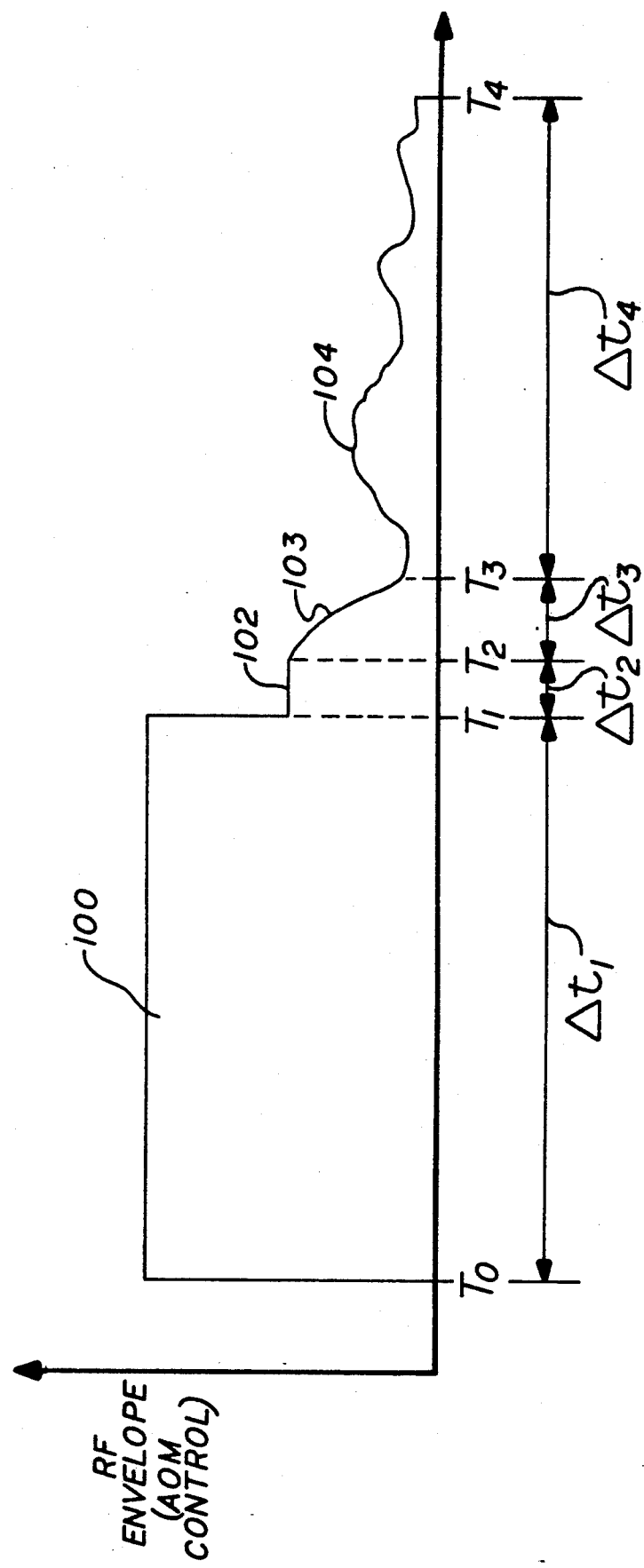

SINGLE FREQUENCY, LONG TAIL SOLID STATE LASER INTERFEROMETER SYSTEM

BACKGROUND OF THE INVENTION

The development of laser sources to emit large pulses of energy followed by a long tail of low energy quasi CW signal are known in the prior art. Several investigators have developed laser sources with this characteristic, but none seem to have enlarged on its use in interferometric circuit devices designed for practical applications where efficient detection is required, and frequency and intensity stabilities of the local oscillator portion of the pulse are critical. Such a practical application is the measurement of atmospheric conditions such as wind turbulence at variable distances ahead of a flying aircraft.

Stephen Marcus and Theodore Quist in U.S. Pat. No. 4,447,149 have developed a laser apparatus utilizing a Q-switched laser unit to generate laser pulse signals with a low intensity trailing tail. The low intensity tail is utilized as a local oscillator signal that is combined with the target return from the emitted pulse signal.

Their device is utilized as a pulsed laser radar system and, in a general sense, embodies the minimum elements which theoretically would form a target sensing, single source created target and reference beam system. Their disclosure seems directed to the use of gas lasers only, and tends only to conjecture the control necessary of a few critical parameters for effectively making such a system viable for practical use. No insight or discussion is provided on creating a usable system with solid state lasers.

Robert Harney in U.S. Pat. No. 4,298,280 has presented an infrared radar system comprised of an infrared laser to provide a succession of transmitted pulses shaped to have a high intensity spike followed by a relatively low intensity quasi-CW portion. However, the lower intensity tail is not used to create the reference beam. A local oscillator laser is used for that purpose. The high intensity spike is used to obtain range information while the following lower intensity portion is used for providing the stable frequency part for Doppler analysis.

I. Goldstein and A. Chabot have published the article "Characteristics of a Traveling-Wave Ruby Single-Mode Laser as a Laser Radar Transmitter" in the Journal of Quantum Electronics, Vol. QE-2, No. 9, September 1966, pp. 519–523. Their published work describes a solid state ruby laser set up to emit spike shaped pulse followed by a low level CW portion of much longer duration. The CW portion was planned to serve as a reference signal to perform optical heterodyning with the target echo of the spike pulse.

Goldstein and Chabots paper described their studies of this laser device with regard to matters such as laser coherence, frequency shift during the pulse and the method for achieving the single mode. They did find problems with frequency stability. They also observed the oscillating nature of the CW portion, but felt it not important for their purposes.

U.S. Pat. No. 4,690,551 by Edwards et al presents a laser radar utilizing pulse-tone waveforms, but utilizes a separate CW laser to generate local oscillator reference signal for multiplexing with the target return signal.

U.S. Pat. No. 3,856,402 by Low et al presents a clear air turbulence detector utilizing a gaseous $CO_2$ master oscillator laser for emitting a signal shaped into pulses to a target area, and then beats their return echoes against a second portion of the CW $CO_2$ signal.

Notwithstanding the material presented in the prior art, there remains a major need to develop a compact device for air turbulence measurement from a moving aircraft.

An object of this invention is to present a solid state laser system operated in a single frequency mode to provide both a high energy target pulse for reflection from an atmospheric disturbance, and a longer duration low energy quasi CW signal coherent with the high energy pulse for heterodyning the two at the detection stage for accurate interferometric and Doppler analysis.

A further object of this invention is to present a solid state laser system comprising beam splitters and detectors positioned to monitor and control the creation of a single frequency high energy pulse and a smooth low energy tail of the same frequency for use in interferometric and Doppler detection and analysis of air turbulence.

Another object of this invention is to present a laser system as mentioned above which will occupy minimum space and operate from an aircraft in flight.

FIELD OF THE INVENTION

This invention relates to a laser source for use in an interferometric system whereby the laser source provides a powerful pulse of optical energy to transit one leg of the interferometer including reflection off a target and return along the same path as the outward beam, and a low level quasi CW tail off the same pulse to transit a second reference path of the interferometer and then recombined with the returning pulse for analysis.

SUMMARY OF THE INVENTION

This invention presents a specialized laser source and an air turbulence detection system designed to occupy small volume and to allow the detection and measurement of air turbulence at several distances ahead of an aircraft while in flight. It comprises a solid state laser source, preferably a Holmium laser, configured with feedback control to initiate and form a Q-switched pulse of high energy for emission to a target atmosphere, and to form a lower energy quasi-CW reference signal for heterodyning with the returning echo pulse.

To form a high energy pulse to be focused ahead of an aircraft into a turbulent medium a solid state laser rod is activated by a flashlamp to establish the lasing action within a laser cavity. A Q-switch in the form of an acousto-optic modulator (AOM) under the control of an RF signal intercepts the lasing beam of light within the cavity.

A portion of the incident laser beam is deflected by the AOM to a detector in a primary feedback circuit for the control of the applied RF power. The intensity of the deflected beam is approximately proportional to the applied RF power.

The RF power is applied to the AOM as soon as the laser flash lamp pump turns on. The detector then outputs a current signal level proportional to the intensity of the deflected beam outside the laser resonator. When, during the prelase phase, the intensity within the resonator reaches a preselected level, the RF power to the AOM is partially turned off thereby causing an intense Q-switched pulse to pass through the AOM for focusing to a turbulent medium.

Shortly after the high energy pulse has been generated the RF power to the AOM can be further reduced to allow the pulse energy to decay into a long quasi CW tail. It is a portion of this low energy tail which is used as a local oscillator to combine with the reflected pulse returning to the instrument for analysis of the pulse signal by interferometric techniques as well as Doppler analysis.

However, the intensity of the quasi-CW pulse tail is not constant but rather is strongly amplitude modulated. To overcome problems with this modulation, these fluctuations are controlled by using a secondary feedback circuit to continue a finer level of RF power control of the Q-switch AOM during the quasi-CW tail period following the pulse.

A second AOM placed in the laser beam path downstream from the Q-switch AOM is triggered on between the passage of the high energy pulse and the beginning of the quasi-CW tail to deflect a portion of this tail through a second detector into the secondary feedback circuit. This secondary feedback circuit is programmed to smooth fluctuations detected in the tail signal by adjusting the RF signal controlling the Q-switch AOM to adjust the intensity of the laser tail passing through it.

By these means a more stable quasi-CW tail is available for heterodyning with the returning echo pulse. The analysis of the content of the returned echo pulse is thereby more effectively accomplished to yield data on the velocity structure, reflectivity intensity, and phase information pertaining to air turbulence located in the path of the laser pulse.

BRIEF DESCRIPTION OF THE DRAWINGS

FIG. 2 is a gain plot showing mode selection accomplished with etalon.

FIG. 5 shows a representative plot of the RF power applied to the Q-switch AOM throughout the entire cycle to accomplish the objectives of the invention.

DESCRIPTION OF THE PREFERRED EMBODIMENT

In a broad perspective, this invention presents over the prior art a device and method for generating a high peak Q-switched laser pulse to be transmitted to a distant reflecting medium; the high peak power pulse being thereafter followed by a low power quasi-CW tail. Returning echoes from the high peak power pulse are heterodyned with the low power quasi-CW tail for analysis of information contained in the reflected pulse.

An important aspect of this invention is the ability to timely trigger the Q-switch to release a pulse at a single frequency. The invention accomplishes this through detection of a preselected threshold during prelase phase of the laser output energy to identify a time to trigger the Q-switch for emission of the high energy pulse.

A second aspect of the invention comprises the capability to sense the low energy quasi-CW tail energy level and, through a feedback circuit, to control an acousto-optic modulator switch to effect stabilization of the amplitude of this tail.

Figure 1:
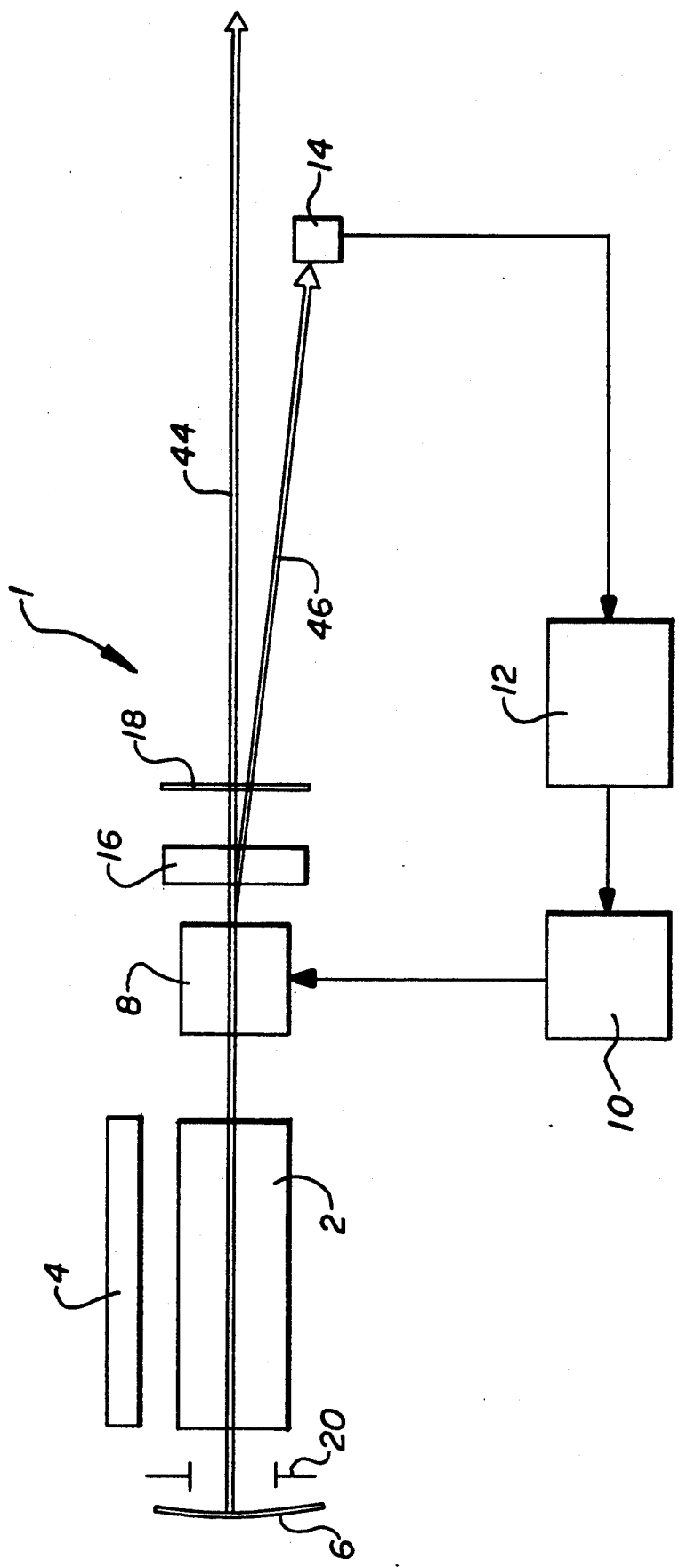
FIG. 1 shows a single feedback control loop for generation of a single frequency pulse.

A laser resonator is shown in FIG. 1 with a feedback loop showing detection of a diverted beam 46 from the laser cavity by a detector 14. The configuration shown in FIG. 1 is the feedback control loop for generation of single frequency pulses.

The laser cavity comprises a reflecting mirror 6, a laser rod 2, a flashlamp 4, an acousto-optic modulator serving as a Q-switch 8, an etalon 16, and a semi-transparent mirror 18 at the front end of the cavity. When the cavity is lasing light traverses along a laser axis 44 with some portion being output to a remote target. Except for possible simple on-off switching purposes, Q-switch 8 is recognized as not essential for the normal operation of a general purpose laser cavity, and would normally not be included except for the purposes of this invention.

An aperture 20 is placed in the cavity to limit laser oscillation to the lowest order transverse mode. The aperture 20 may be combined with a lens to compensate for thermal gain medium lensing and to increase efficiency.

The laser or gain medium 2 utilized in the invention has been a Cr, Th, Ho:YSGG laser operating at 2.1$\mu$. The flashlamp 4 serving as a pump source has been a Xe flashlamp.

The etalon, or multi-mirror resonator 16 is configured to have few (3-10) resonant modes occur within that part of the gain medium spectrum above a preselected threshold as shown in FIG. 2. In one tested resonator a 4 mirror resonator with power reflectivities of 99.5%, 3.5%, 3.5%, and 80% was employed.

The Q-switch 8 serves to control the capability of the laser cavity to generate laser pulses and to control fine adjustments to the amplitude of laser pulses emitted from the laser cavity. The Q-switch 8 employed has been a $SiO_2$ acousto-optic modulator operated by a RF power signal which allowed flexible temporal control by the feedback loop.

The feedback control loop comprises detector 14 which connects to a control unit 12 and then to a Q-switch driver 10 which provides the RF power signal for control of Q-switch 8. The control unit 12 monitors and controls the timing functions and generates a control signal to modulate the RF power signal generated by Q-switch driver 10. The modulated RF power signal then controls the laser beam amplitude allowed to exit the laser cavity through the switching function of Q-switch 8 as mentioned above. Although the electronic configuration within control unit 12 may be unique in its specific design to the present inventors embodiment, it is recognized that such designs are varied and within the common knowledge available from the prior art.

During the prelase condition of laser cavity 1, Q-switch 8 is in an off state of operation, i.e., receiving an RF signal from Q-switch driver 10. In this off state Q-switch 8 causes the light beam to be deflected 46 towards detector 14 and prevents the laser cavity from generating a strong laser signal or pulse.

Single frequency operation of the laser is achieved via the combination of transverse mode control by aperture 20, longitudinal mode selection by etalon 16, and monitoring the prelase stage through feedback detector 14.

Prelasing is the technique employed here to discriminate against all but one frequency. This technique allows the mode with the largest gain (least loss) to build-up in intensity faster than other (higher loss) frequencies. When Q-switch 8 is activated for transmission of the laser beam along axis 44 to produce the high power laser pulse the dominant frequency will cause depletion of the gain medium before any other competing frequencies can participate, thus producing a predominately single frequency output.

Figure 3A:
FIGS. 3A-3E are a series of plots relating the RF power, the pump power, the Q-switch AOM transmission, the gain medium, and the Log of the output laser power to time.
Figure 3B:
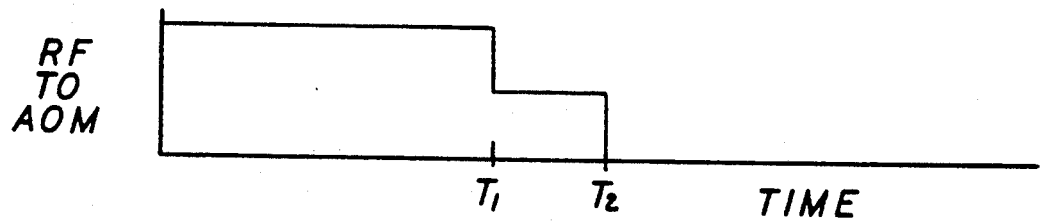
Figure 3C:
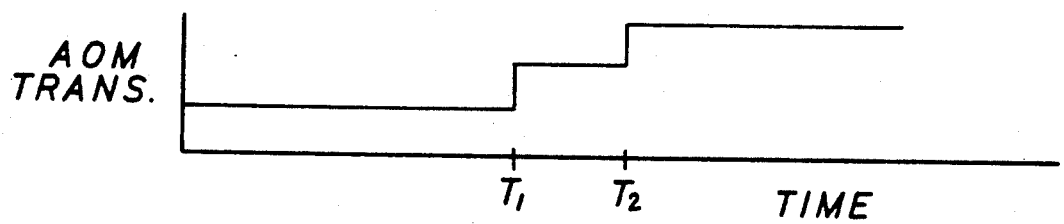

The details of control through the prelase phase and generation of the high peak power pulse are exhibited as functions of time in FIG. 3a through e. FIG. 3a shows a plot with time of the pump power provided by flashlamp 4. The RF power signal to Q-switch 8 is shown in FIG. 3b. The transmission through Q-switch 8 is shown in FIG. 3c.

As shown in FIG. 3a the laser is activated by pump source 4 through a large intensity flash of energy at the early portion of the operation. Control of Q-switch 8, shown in FIG. 3b, has the RF signal high to a time $T_1$ at which time the signal is dropped in intensity to a second preset level for a further time interval to $T_2$. During the time difference from $T_1$ to $T_2$ the high peak energy pulse will be generated and will output the laser.

Transmission capability through the acousto-optic modulator Q-switch 8 as shown in FIG. 3c is low up to time $T_1$ and then becomes higher between times $T_1$ and $T_2$ and is essentially open in this example after time $T_2$. This time plot represents the capability of the Q-switch transmission and not the intensity of the light travelling through and from said Q-switch.

Figure 3D:
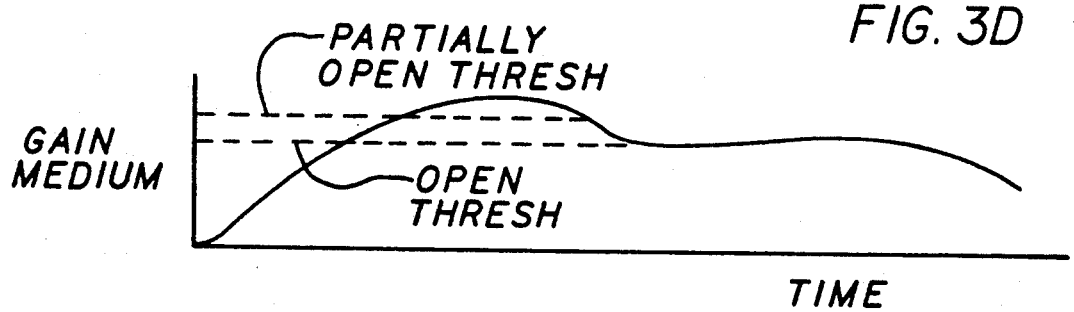
Figure 3E:
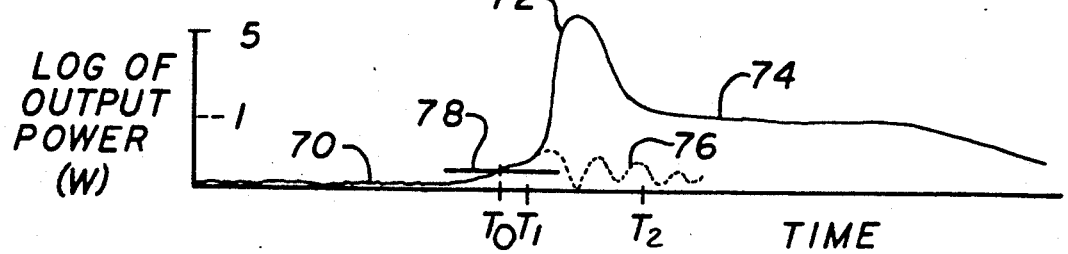

The gain medium intensity as a function of time is shown in FIG. 3d. FIG. 3e then shows the log of the output power along path 44 from the laser throughout the entire process.

Looking at FIG. 3e, we note that up to time $T_1$ we are in a prelase phase 70, and between $T_1$ and $T_2$ the high peak power Q-switch pulse is emitted. Following the time $T_2$ the low power quasi-CW tail 74 occurs. The quasi-CW tail is produced when the Q-switch is only partially opened at time $T_1$ to form Q-switch pulse 72, then further opened at time $T_2$ during the downward decay of pulse 72.

FIG. 2 allows us a vision at understanding how single frequency operation of the laser is actually accomplished. Shown is the mode spectrum for the laser with its gain plotted as a function of the frequency being transmitted within the gain medium. By setting a threshold, one can isolate a range for frequency between a high value $F_H$ and a low value $F_L$ as shown. It is to be noted that the frequency gain spectrum envelop changes as time proceeds during pumping by pump source 4.

From FIG. 2, we see that under the gain spectrum envelop we would have many frequency modes 92 if etalon 16 were not installed. With etalon 16 in place mode selection has occurred and just a few modes 90 are actually available under the envelop.

To achieve a single mode to be in existence at the time the high peaked power pulse 72 is generated, it is necessary to monitor through detector 14 in the primary feedback loop the prelase power output as shown in FIG. 3e. By experience and experimentation one is able to determine a threshold level occurring during the prelase phase which will occur at some time $T_0$ from which it is known that a certain preselected time difference $T_1$ minus $T_0$ is a correct time delay before partially opening Q-switch 8. Opening of the Q-switch at this preselected time T serves to sort out a single frequency mode to be transmitted a the high peak power Q-switch pulse 72, which also continues to later comprise the low power quasi-CW tail 74.

Had the Q-switch not been partially turned on at time $T_1$, FIG. 3e also shows that the prelase condition would have continued as an oscillating low energy level beam of light 76 within the laser cavity 1. Detection of the prelase threshold level 78 at $T_0$ occurs on the first oscillation in the prelase signal 76. The frequency generated by this technique is not always the same frequency for every generated high energy laser pulse. However, when utilizing the instrument in an interferometric mode this creates no problem in its use.

Figure 4:
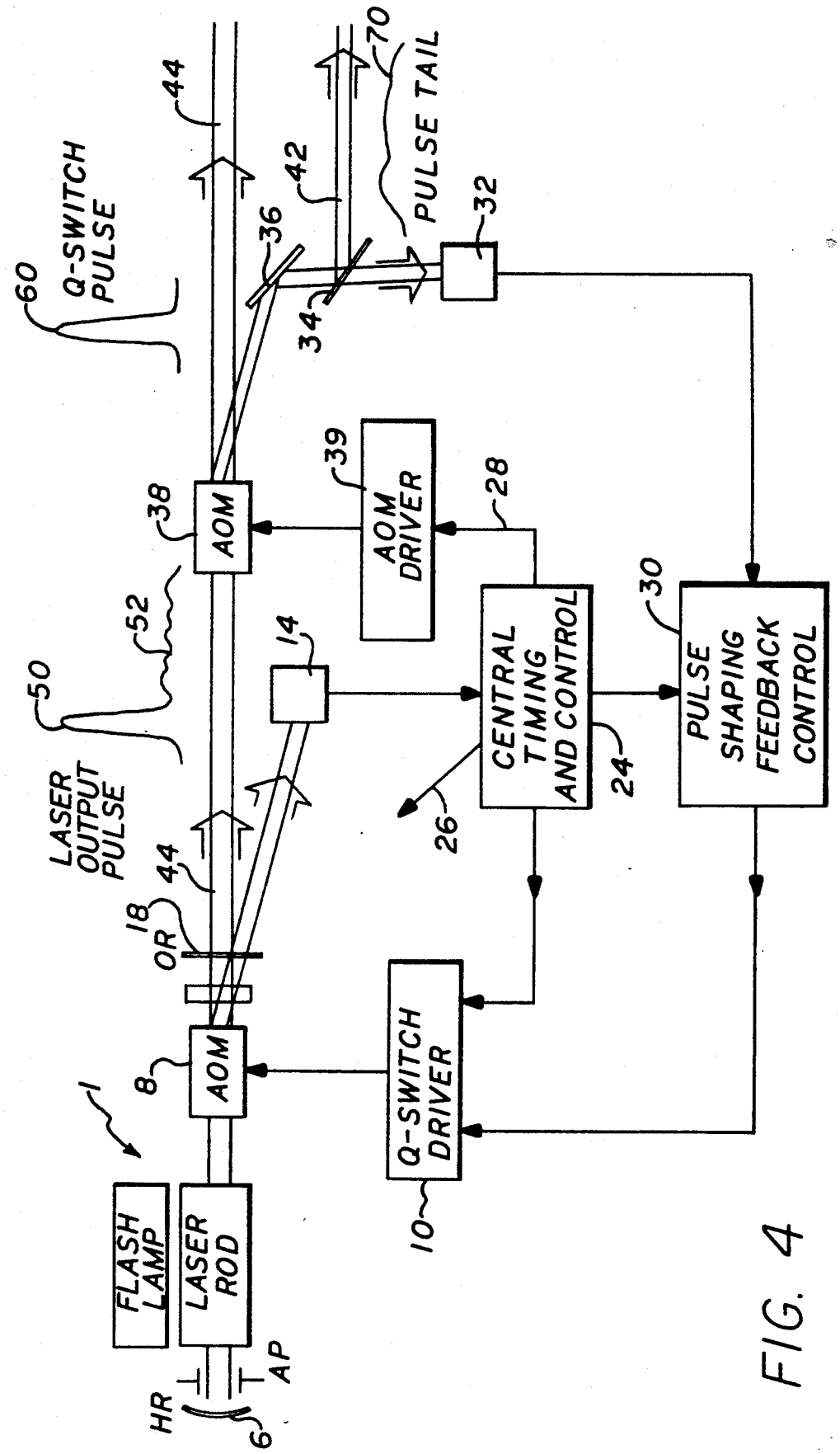
FIG. 4 shows this laser system configuration with the primary feedback loop for generation of the pulse and the secondary feedback loop for generation of a constant, stable quasi-CW tail.

In theory, the log of the output power exhibited in FIG. 3e as a function of time would occur with this apparatus and method, particularly noting that the low power quasi-CW tail 74 appears more or less stable for the remaining portion of time exhibited. Realistically, the low power quasi-CW tail 74 tends to oscillate in a noisy manner, thereby making it difficult to work with for analysis when heterodyned with a returning echo of the high peak power pulse 72. FIG. 4 shows a plot of the log of the output power as a function of time with the high peak power pulse 50 followed by an unsmoothed, oscillating, low energy quasi-CW tail 52. In order to smooth and control oscillations in quasi-CW tail 52, a second feedback circuit is utilized as shown in FIG. 4.

FIG. 4 comprises the laser cavity 1 shown in FIG. 1, its feedback detector 14 and associated feedback loop to Q-switch 8, and in addition, shows the use of a second acousto-optic modulator 38 deflecting the quasi-CW tail to a detector 32 and back through a pulse tail and feedback control 30.

In this embodiment feedback detector 14 feeds its signal to a central timing and control unit 24 which outputs a control signal to Q-switch driver 10 as described in the embodiment of FIG. 1. During generation of the high energy Q-switched pulse as described above this primary feedback loop is functional.

The central timing and control unit 24 directs the timing operation of the entire laser system by outputting a laser trigger 26 which feeds laser flashlamp 4 thereby starting a pulse generation cycle of the laser system, a control signal 28 to an AOM driver 39 for switching operation of AOM 38 via a RF signal output from AOM driver 39, and a timing control signal to pulse shaping feedback control 30.

The secondary feedback loop is now utilized to control the oscillations in the low power quasi-CW tail 52. This feedback loop comprises the second acousto-optic modulator 38, AOM driver 39, reflector 36, beam splitter 34, the second feedback detector 32, and pulse shaping feedback control unit 30 which is then connected to control Q-switch driver 10 and Q-switch 8. This feedback circuit is configured to create a smoothed pulse tail 70 as shown in FIG. 4 as a function of time Acousto-optic modulator 38 is not triggered to deflect beam 40 to mirror 36 until after the high peak power Q-switch pulse 60 is emitted from the system as the target pulse. Pulse 60, of course, would travel to a target which would cause a portion of the pulse to be reflected back and received at some later time at the system.

Once Q-switch pulse 60 has been transmitted, central timing and control unit 24 commands the tail to be diverted by AOM driver 39 and AOM 38 to mirror 36 and beam splitter 34, where it is again reflected along a "local oscillator" path 42 to be heterodyned with the returning echo of the Q-switch pulse at some later time. A portion of the tail is transmitted through beam splitter 34 and is received by the second detector 32.

Detector 32 monitors the fluctuations of the pulse tail. The detector output is fed to pulse shaping feedback control unit 30 which, also under timing control from central timing and control unit 24, generates a voltage signal with an amplitude directly related to the square root of the pulse tail intensity. This signal is the output from pulse shaping feedback control unit 30 to modulate the RF signal generated and amplified by Q-switch driver 10. This results in a Q-switch 8 deflection efficiency that is proportional to the pulse tail intensity.

The design of pulse shaping feedback control unit 30 takes into account the time delays associated with Q-switch and the resonant energy buildup time in laser cavity 1. The pulse shaping feedback control unit 30 estimates the pulse tail intensity at a lead time equal to the total resonant response time of laser cavity 1 by measuring the present amplitude of detector 32 output current and its temporal derivative.

In summary the voltage output of pulse shaping feedback control unit 30 is given by:

$$v(t) = K_1[i_d(t+b)]^{1/\kappa}$$

and the Q-switch deflection efficiency (i.e., inverse of transmission) is equal to $$N(t) = K_2 P_{RF}(t) \alpha v^2(t) = K_1^2 i_d(t+b)$$

where t is time,
$i_d$ is detector 32 output current,
b is the resonant response time of laser cavity 1,
$K_1$ and $K_2$ are constants, and
$P_{RF}(t)$ is applied RF signal power.

FIG. 5 shows a plot as a function of time of the RF control signal to acousto-optic modulator 8. The portion of the envelop during lasing operation 100 from the time flashlamp 4 was activated to the time that acousto-optic modulator 8 was opened to start transmission of the Q-switch pulse is represented by the time length $\Delta t_1$. $\Delta t_2$ represents the time difference between $T_1$ and $T_2$ as shown in prior figures which is the period during which the Q-switch pulse is created. After time $T_2$ the RF signal is allowed to slowly decay 103 to some predetermined time $T_3$ at which time a signal from central timing and control unit 24 to acousto-optic modulator 38 is emitted to activate acousto-optic modulator 38. At times after $T_3$ and during an interval $\Delta t_4$ pulse shaping feedback control unit 30 functions to minimize oscillations in the tail energy.

The purpose of slowly decaying RF signal 103 is to remove some of the initial intensity fluctuations that would occur in the quasi-CW pulse tail. At time $T_3$ pulse shaping and feedback control 30 will set in and apply a signal whose amplitude 104 is a function of and determined by detector 32 output current. This signal which controls acousto-optic modulator 8 serves to control the intensity of the beam emitted through acousto-optic modulator 8 in a manner that the intensity of the quasi-CW pulse tail is smooth. Smoothing of the quasi-CW pulse tail facilitates more effective and useful analysis of the returned signal information when the echo of the Q-switch pulse returns and is heterodyned with the quasi-CW pulse tail signal.

While this invention has been described with reference to its presently preferred embodiment, its scope is not limited thereto. Rather such scope is only limited insofar as defined by the following set of claims and includes all equivalents thereof.

What is claimed is:

1. A single frequency laser system which comprises:
    a laser source resonator cavity for generating a single frequency laser beam signal shaped as a high energy pulse signal immediately followed by a lower energy quasi-CW tail signal;
    a means for directing said high energy pulse signal along a first path towards a preselected external reflective substance which constitutes a target medium for reflecting a portion of said high energy pulse signal back upon itself;
    a first means for switching positioned in said first path to intercept and direct said lower energy quasi-CW tail signal along a second path not interacting with said target medium;
    a second means for switching, positioned in the laser beam path within said laser source resonator cavity, to controllably switch the laser beam between a resonant laser beam path which exits to said first and second paths and a detector beam path positioned off-axis to said resonant laser beam path;
    a first detector positioned in said detector beam path to intercept the laser beam and measure its intensity during a prelase portion of said laser beam signal;
    a central timing and control means connected with an input from said first detector, and connected to output a control signal to said first and second switching means; and
    a means for receiving said reflected portion of said high energy pulse signal and combining it with said lower energy quasi-CW tail signal on said second path to form a heterodyned signal.

2. The single frequency laser system according to claim 1 wherein the laser source resonator cavity comprises:
    a gain medium;
    a flashlamp placed proximate to said gain medium whereby said gain medium is induced to lase when said flashlamp is excited thereby creating a laser beam along the optical axis of said gain medium;
    a concave mirror positioned at one end of said cavity and on said optical axis whereby said concave mirror will intercept and reflect said laser beam back along said optical axis;
    a partially reflecting planar mirror positioned at an opposite end of said cavity and on said optical axis whereby said planar mirror will intercept and reflect part of said laser beam back along said optical axis and allow part of said laser beam to pass through;
    an aperture positioned on said optical axis whereby a single transverse mode of said laser beam is allowed to propagate; and
    an etalon positioned on said optical axis whereby a few frequency modes are allowed to propagate.

3. The single frequency laser system according to claim 2 wherein the laser source resonator cavity further comprises:
    a lens in combination with said aperture to enhance allowance of said single transverse mode selection.

4. The single frequency laser system according to claim 3 further comprising:
    a means for analyzing and displaying said heterodyned signal.

5. The single frequency laser system according to claim 2 wherein the central timing and control means comprises:

a first electronic circuit programmed to detect a time of occurrence, $T_0$, of a preselected intensity threshold level during the prelase portion of said laser beam, then at a preselected time difference following $T_0$, occurring at $T_1$, said electronic circuit causes a control signal to be emitted by said central timing and control means to activate said second switching means to open a preselected amount thereby allowing said laser beam to propagate along said resonant laser beam path of said laser resonator cavity until a third preselected time, $T_2$, whereby said high energy pulse signal portion of said single frequency laser beam signal is formed, and thereafter causing said second switching means to open fully thereby allowing the remainder of said laser beam to propagate along said resonant laser beam path whereby said lower energy quasi-CW tail signal is formed and simultaneously causing said first switching means to direct said lower energy quasi-CW tail signal along said second path.

6. The single frequency laser system according to claim 5 further comprising:

a means for analyzing and displaying said heterodyned signal.

7. The single frequency laser system according to claim 5 which further comprises:

a means for monitoring and modifying only said lower energy quasi-CW tail signal.

8. The single frequency laser system according to claim 7 wherein the means for monitoring is a second feedback circuit which comprises:

a second detector positioned in said second path to measure the intensity of said lower energy quasi-CW tail signal; and a pulse shaping feedback control connected with inputs from said second detector and said controlling means, and an output control connected to said second switching means.

9. The single frequency laser system according to claim 8 wherein the pulse shaping feedback control comprises:

a second electronic circuit programmed to measure oscillations in the intensity of said lower energy quasi-CW tail signal, and to output a smoothing control signal to said first switching means.

10. The single frequency laser system according to claim 9 further comprising:

a means for analyzing and displaying said heterodyned signal.

11. The single frequency laser system according to claim 1 wherein the central timing and control means comprises:

a first electronic circuit programmed to detect a time of occurrence, $T_0$, of a preselected intensity threshold level during the prelase portion of said laser beam, then at a preselected time difference following $T_0$, occurring at $T_1$, said electronic circuit causes a control signal to be emitted by said central timing and control means to activate said second switching means to open a preselected amount thereby allowing said laser beam to propagate along said resonant laser beam path of said laser resonator cavity until a third preselected time, $T_2$, whereby said high energy pulse signal portion of said single frequency laser beam signal is formed, and thereafter causing said second switching means to open fully thereby allowing the remainder of said laser beam to propagate along said resonant laser beam path whereby said lower energy quasi-CW tail signal is formed, and simultaneously causing said first switching means to direct said lower energy quasi-CW tail signal along said second path.

12. The single frequency laser system according to claim 11 further comprising:

a means for analyzing and displaying said heterodyned signal.

13. The single frequency laser system according to claim 11 which further comprises:

a means for monitoring and modifying only said lower energy quasi-CW tail signal.

14. The single frequency laser system according to claim 13 wherein the means for monitoring is a second feedback circuit which comprises:

a second detector positioned in said second path to measure the intensity of said lower energy quasi-CW tail signal; and a pulse shaping feedback control connected with inputs from said second detector and said controlling means, and an output control connected to said second switching means.

15. The single frequency laser system according to claim 14 wherein the pulse shaping feedback control comprises:

a second electronic circuit programmed to measure oscillations in the intensity of said lower energy quasi-CW tail signal, and to output a smoothing control signal to said first switching means.

16. The single frequency laser system according to claim 15 further comprising:

a means for analyzing and displaying said heterodyned signal.

17. The single frequency laser system according to claim 1 which further comprises:

a means for monitoring and modifying only said lower energy quasi-CW tail signal.

18. The single frequency laser system according to claim 17 wherein the means for monitoring is a second feedback circuit which comprises:

a second detector positioned in said second path to measure the intensity of said lower energy quasi-CW tail signal; and a pulse shaping feedback control connected with inputs from said second detector and said controlling means, and an output control connected to said second switching means.

19. The single frequency laser system according to claim 18 wherein the pulse shaping feedback control comprises:

a second electronic circuit programmed to measure oscillations in the intensity of said lower energy quasi-CW tail signal, and to output a smoothing control signal to said first switching means.

20. The single frequency laser system according to claim 19 further comprising:

a means for analyzing and displaying said heterodyned signal.

21. The single frequency laser system according to claim 1 wherein the first and second means for switching comprise:

an acousto-optic switch known as a Q-switch.

22. A single frequency laser system which comprises:

a laser source resonator cavity for generating a single frequency laser beam signal shaped as a high energy pulse signal immediately followed by a lower energy quasi-CW tail signal;

a means for directing said high energy pulse signal along a preselected first path;

a first means for switching positioned in said first path to intercept and direct said lower energy quasi-CW tail signal along a second path not interacting with said target medium;

a second means for switching, positioned in the laser beam path within said laser source resonator cavity, to controllably switch the laser beam between a resonant laser beam path which exits to said first and second paths and a detector beam path positioned off-axis to said resonant laser beam path;

a first detector positioned in said detector beam path to intercept the laser beam and measure its intensity during a prelase portion of said laser beam signal; and a central timing and control means connected with an input from said first detector, and connected to output a control signal to said first and second switching means.

23. The single frequency laser system according to claim 22 wherein the central timing and control means comprises:

a first electronic circuit programmed to detect a time of occurrence, $T_0$, of a preselected intensity threshold level during the prelase portion of said laser beam, then at a preselected time difference following $T_0$, occurring at $T_1$, said electronic circuit causes a control signal to be emitted by said central timing and control means to activate said second switching means to open a preselected amount thereby allowing said laser beam to propagate along said resonant laser beam path of said laser resonator cavity until a third preselected time, $T_2$, whereby said high energy pulse signal portion of said single frequency laser beam signal is formed, and thereafter causing said second switching means to open fully thereby allowing the remainder of said laser beam to propagate along said resonant laser beam path whereby said lower energy quasi-CW tail signal is formed.

24. A method for a single frequency laser system which comprises the following steps:

generating a laser beam in a laser source resonator cavity;

controlling said laser source resonator cavity for generating a single frequency laser beam signal which forms a high energy pulse signal immediately followed by a lower energy quasi-CW tail signal;

directing said high energy pulse signal portion along a first path towards a preselected external reflective substance which constitutes a target medium for reflecting a portion of said high energy pulse signal back upon itself;

switching said lower energy quasi-CW tail signal along a second path not interacting with said target medium;

monitoring oscillations in the intensity of said lower energy quasi-CW tail signal;

shaping said lower energy quasi-CW tail signal whereby said undesired oscillations in said lower energy quasi-CW tail signal are removed by smoothing; and combining said reflected high energy pulse signal with said smoothed lower energy quasi-CW tail signal and heterodyning said two signals.

25. A method for a single frequency laser system which comprises the following steps:

generating a laser beam in a laser source resonator cavity containing a mode selector and etalon;

blocking said laser beam from exiting said laser source cavity with a switching means during the prelase period of said laser beam;

detecting a time of occurrence, $T_0$, of a preselected intensity threshold level during the prelase period of said laser beam;

opening said switching means a predetermined amount at a predetermined time $T_1$ determined from knowledge of $T_0$ to allow a high energy pulse signal portion of said single frequency laser beam signal to be formed and to exit said source laser cavity;

opening said switching means completely at a predetermined time $T_2$, determined by knowledge of $T_1$, whereby a lower energy quasi-CW tail signal is formed and emitted;

directing said high energy pulse signal portion along a first path towards a preselected external reflective substance which constitutes a target medium for reflecting a portion of said high energy pulse signal back upon itself; and switching said lower energy quasi-CW tail signal along a second path not interacting with said target medium.

26. A method for a single frequency laser system which comprises the following steps:

generating a laser beam in a laser source resonator cavity containing a mode selector and etalon;

blocking said laser beam from exiting said laser source cavity with a switching means during the prelase period of said laser beam;

detecting a time of occurrence, $T_0$, of a preselected intensity threshold level during the prelase period of said laser beam;

opening said switching means a predetermined amount at a predetermined time $T_1$ determined from knowledge of $T_0$ to allow a high energy pulse signal portion of said single frequency laser beam signal to be formed and to exit said source laser cavity;

opening said switching means completely at a predetermined time $T_2$, determined by knowledge of $T_1$, whereby a lower energy quasi-CW tail signal is formed and emitted;

directing said high energy pulse signal portion along a first path towards a preselected external reflective substance which constitutes a target medium for reflecting a portion of said high energy pulse signal back upon itself;

switching said lower energy quasi-CW tail signal along a second path not interacting with said target medium;

monitoring oscillations in the intensity of said lower energy quasi-CW tail signal;

shaping said lower energy quasi-CW tail signal whereby said undesired oscillations in said lower energy quasi-CW tail signal are removed by smoothing; and combining said reflected high energy pulse signal with said smoothed lower energy quasi-CW tail signal and heterodyning said two signals.

27. A single frequency laser system which comprises:
a laser source resonator cavity for generating a single frequency laser beam signal shaped as a high energy pulse signal immediately followed by a lower energy quasi-CW tail signal;
a means for switching, positioned in the laser beam path within said laser source resonator cavity, to controllably switch the laser beam between a resonant laser beam path which exits said laser source resonator cavity and a detector beam path positioned off-axis to said resonant laser beam path;
a detector positioned in said detector beam path to intercept the laser beam and measure its intensity during a prelase portion of said laser beam signal; and
a central timing and control means connected with an input from said detector, and connected to output a control signal to said switching means, said central timing and control means programmed to detect a time of occurrence, $T_0$, of a preselected intensity threshold level during the prelase portion of said laser beam, then at a preselected time difference following $T_0$, occurring at $T_1$, said central timing and control means causes a control signal to be emitted to activate said switching means to open a preselected amount thereby allowing said laser beam to propagate along said resonant laser beam path of said laser resonator cavity until a third preselected time, $T_2$, whereby said high energy pulse signal portion of said single frequency laser beam signal is formed, and thereafter causing said switching means to open fully thereby allowing the remainder of said laser beam to propagate along said resonant laser beam path whereby said lower energy quasi-CW tail signal is formed.

* * * * *